United States Patent [19]

Huang

[11] Patent Number: 5,613,515
[45] Date of Patent: Mar. 25, 1997

[54] APPARATUS FOR CONNECTING AN INFLATABLE ARTICLE TO A COMPRESSOR

[76] Inventor: Tien-Tsai Huang, No. 4-2, Lane 30, Wu-Chang St., Pan-Chiao City, Taipei Hsien, Taiwan

[21] Appl. No.: 442,179

[22] Filed: May 16, 1995

[51] Int. Cl.⁶ .................................................. F16K 15/20
[52] U.S. Cl. .................................. 137/224; 137/614.2
[58] Field of Search ............................... 137/224, 614.2, 137/522

[56] References Cited

U.S. PATENT DOCUMENTS

| 1,187,300 | 6/1916 | Girard et al. | 137/224 |
| 1,198,476 | 9/1916 | Pearson | 137/224 |
| 2,015,882 | 10/1935 | Brewer | 137/224 |

*Primary Examiner*—John Rivell
*Attorney, Agent, or Firm*—Ladas & Parry

[57] ABSTRACT

An apparatus includes an elongated tube having an air outlet end adapted to be connected to an inflatable article and an air inlet end adapted to be connected to a compressor for supplying compressed air to the inflatable article. The tube has a surrounding wall formed with a radial hole. A flexible bidirectional valve unit is disposed fittingly in the tube and includes a cup-like first check valve member located adjacent to the radial hole. The first valve member opens downwardly and has a base end and an opposite flaring end which contacts tightly and normally an inner surface of the surrounding wall so as to prevent air flow from the inlet end to the outlet end of the tube. The valve unit further includes a cup-like second check valve member which opens upwardly and which is connected integrally to the base end of the first valve member for preventing air flow from the outlet end to the inlet end of the tube. An actuating rod extends into the radial hole and is operable so as to push the flaring end of the first valve member to disengage the inner surface of the surrounding wall in order to permit air flow from the inlet end to the outlet end of the tube. An automatic relief valve unit is mounted to the tube between the valve unit and the air outlet end of the tube and releases air in the tube when pressure therein exceeds a predetermined value.

6 Claims, 4 Drawing Sheets

5,613,515

APPARATUS FOR CONNECTING AN INFLATABLE ARTICLE TO A COMPRESSOR

BACKGROUND OF THE INVENTION

1. Field of the Invention

This invention relates to an apparatus for connecting an inflatable article to a compressor so as to supply compressed air to the inflatable article, more particularly to a connecting apparatus which can stop the supply of compressed air when the pressure in the inflatable article exceeds a predetermined value.

2. Description of the Related Art

The applicant of the present invention has a copending U.S. patent application, filed on Dec. 22, 1994, which discloses an apparatus for controlling the inflation pressure of an inflatable article. The apparatus includes a tube having an air inlet end to be connected to a compressed air supply and an connecting end adapted to be connected to the inflatable article. A retarding means for retarding air flow coming from the air inlet end. The retarding means is mounted adjacent to the air inlet end. A check valve member permits the air flow to flow in a single direction from the inlet end to the connecting end of the tube. The check valve member is mounted slidably in the tube. A pressure relief regulator is mounted adjacent to the connecting end of the tube. The pressure relief regulator includes a valve seat which is connected to the tube and which has a through hole communicating with the interior of the tube, a rotatable cap member having a closed end and an open end which is connected threadedly to the valve seat, a relief valve piston received slidably in the rotatable cap member, and a relief valve spring mounted between the relief valve piston and the closed end of the rotatable cap member. The relief valve spring biases the relief valve piston to the valve seat in order to close the through hole of the valve seat. The rotatable cap member has at least one vent hole communicating with the interior of the rotatable cap member. The vent hole in turn communicates the through hole of the valve seat when the relief valve piston is moved away from the valve seat against a biasing force of the relief valve spring. A coiled spring member has a first end and a second end. The first end of the spring member is connected to the check valve member while the second end of the spring member is connected to the tube so that the check valve member is positioned slidably between the retarding means and the pressure relief regulator. Therefore, when the inflation pressure is in excess of a predetermined value, the relief valve piston will be pushed away from the valve seat by the air flow from the article to be inflated against the relief valve spring and the air will flow out of the pressure relief regulator through the vent hole of the rotatable cap member.

SUMMARY OF THE INVENTION

The main objective of the present invention is to provide an apparatus for connecting an inflatable article to a compressor so as to supply compressed air to the inflatable article, which apparatus can stop the supply of compressed air therethrough at the instant when the pressure in the inflatable article exceeds a predetermined value, thereby obviating the need to deactivate the compressor when the inflatable article is fully inflated.

According to the present invention, an apparatus is used to connect an inflatable article to a compressor so as to supply compressed air to the inflatable article and includes an elongated tube having an air inlet end adapted to be connected to the compressor and an air outlet end adapted to be connected to the inflatable article. The tube further has a surrounding wall formed with a radial hole. A flexible bidirectional valve unit is disposed fittingly in the tube and includes a cup-like first check valve member located adjacent to the radial hole. The first check valve member opens downwardly and has a base end and an opposite flaring end which contacts tightly and normally an inner surface of the surrounding wall of the tube so as to prevent air flow from the inlet end to the outlet end of the tube. The valve unit further includes a cup-like second check valve member which opens upwardly and which has a base end connected integrally to the base end of the first check valve member and an opposite flaring end contacting tightly and normally the inner surface of the surrounding wall of the tube so as to prevent air flow from the outlet end to the inlet end of the tube. A valve actuator includes an actuating rod which extends into the radial hole of the tube and which is operable so as to push the flaring end of the first check valve member to disengage the inner surface of the surrounding wall of the tube in order to permit air flow from the inlet end to the outlet end of the tube. The valve actuator further includes means for mounting slidingly and sealingly the actuating rod to the tube. An automatic relief valve unit is mounted to the tube between the bidirectional valve unit and the air outlet end of the tube. The relief valve unit releases air in the tube when pressure therein exceeds a predetermined value.

BRIEF DESCRIPTION OF THE DRAWINGS

Other features and advantages of the present invention will become apparent in the following detailed description of the preferred embodiment, with reference to the accompanying drawings, of which.

DETAILED DESCRIPTION OF THE PREFERRED EMBODIMENT

Figure 1:
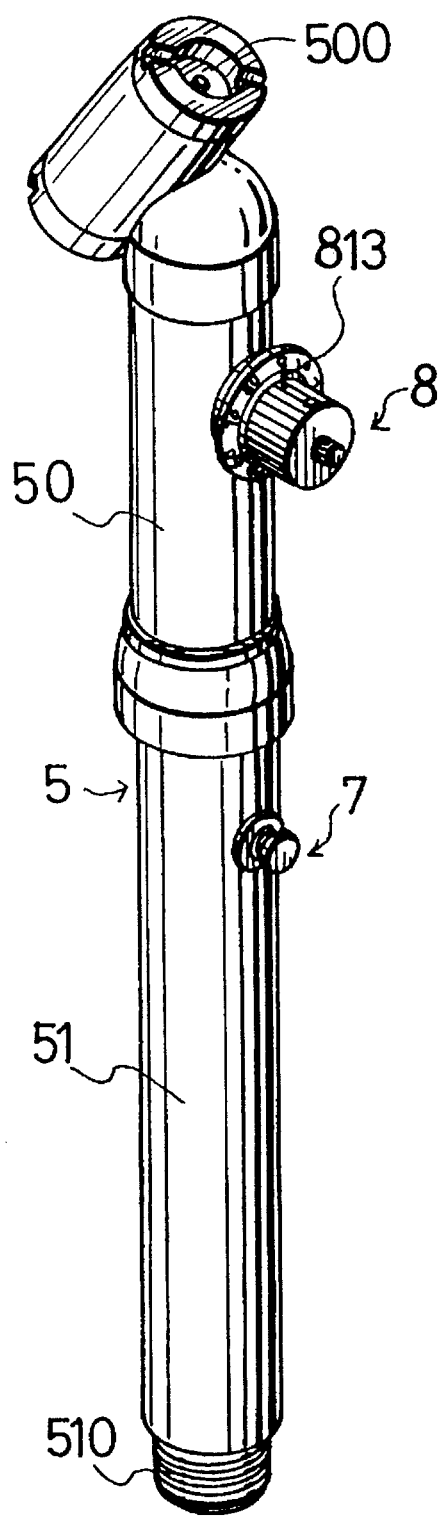
FIG. 1 is a perspective view showing an apparatus for connecting a compressor to an inflatable article in accordance with the present invention.
Figure 2:
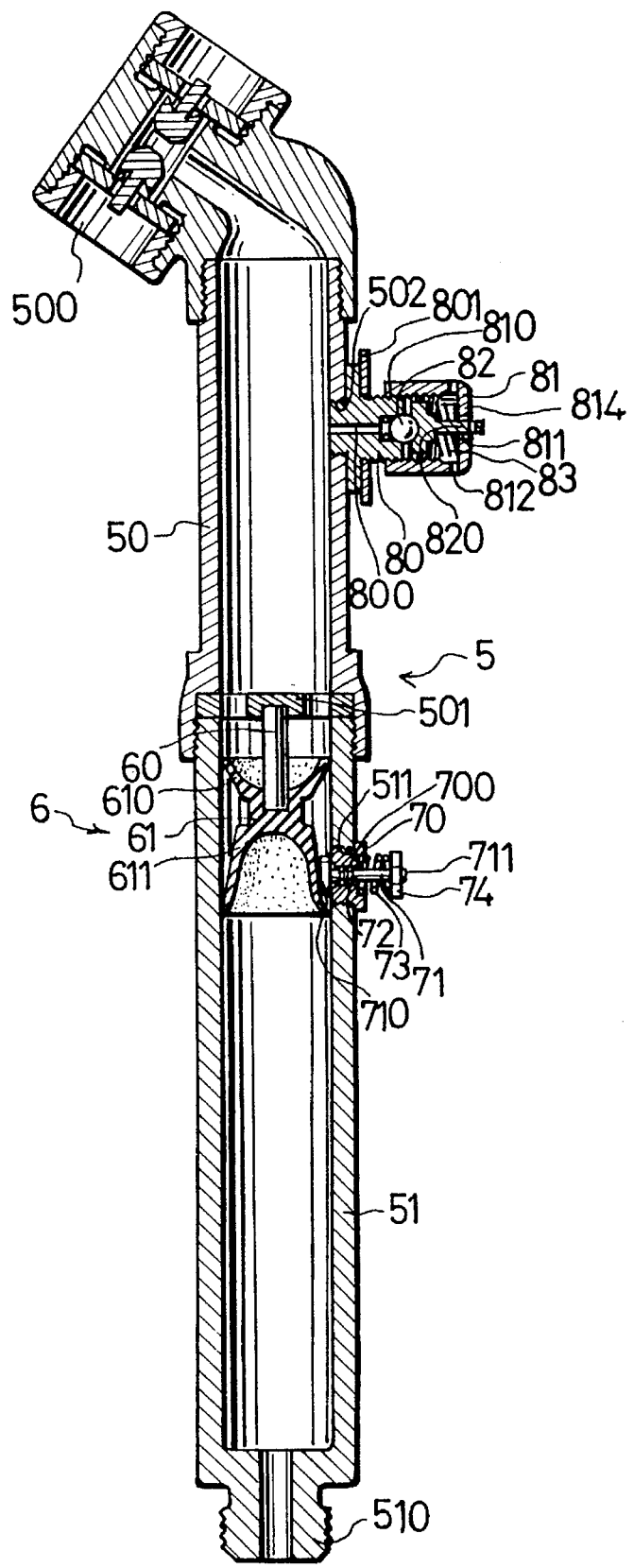
FIG. 2 is a sectional view illustrating the apparatus shown in FIG. 1.

Referring to FIGS. 1 and 2, in accordance with the present invention, an apparatus is used to connect a compressor (not shown) to an inflatable article (not shown), such as a tire, so as to supply compressed air to the inflatable article. The apparatus includes an elongated tube 5, a flexible bidirectional valve unit 6, a valve actuator 7 and an automatic relief valve unit 8.

Figure 3:
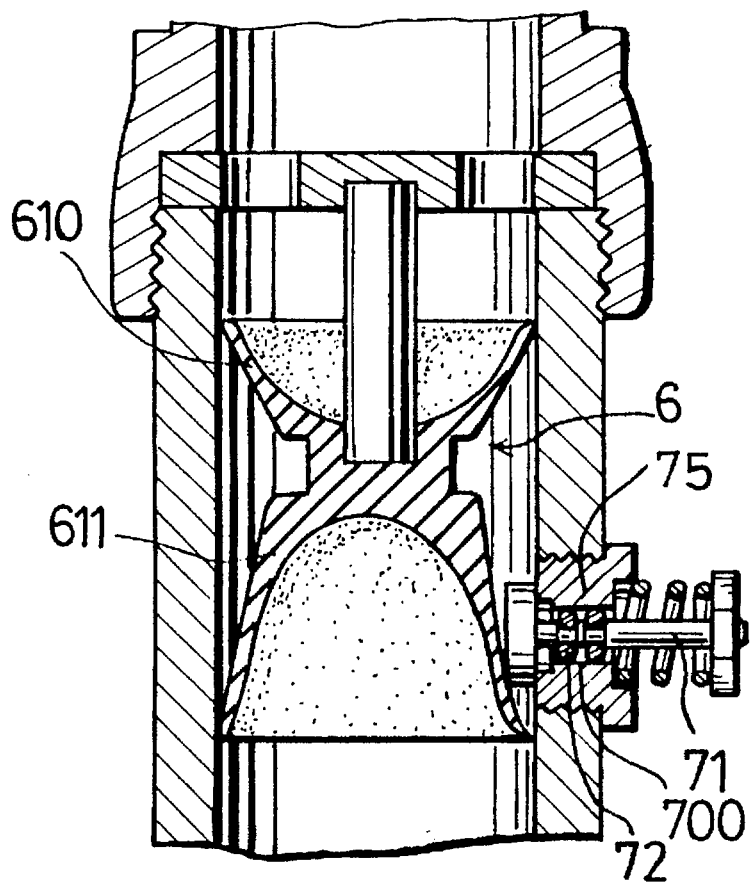
FIG. 3 is an enlarged sectional view illustrating a portion of the apparatus shown in FIG. 2 when an actuating rod of the apparatus is not operated.

Referring to FIGS. 1, 2 and 3, the elongated tube 5 includes a first tube part 50 which has a first end 500 and an internally threaded second end, and a second tube part 51 which has an externally threaded first end connected threadably to the internally threaded second end of the first tube part 50 and a second end 510. A perforated plate 501 is disposed axially in the first tube part 50 adjacent to the second end of the first tube part 50. The first end 500 of the first tube part 50 serves as an air outlet end of the apparatus of the present invention and is adapted to be connected to the inflatable article. In the present embodiment, the first end 500 is a two-headed inflating end, the structure thereof is known in the art and will be omitted herein. The second end 510 of the second tube part 51 serves as an air inlet end of the apparatus of the present invention and is adapted to be connected to the compressor. The tube 50 further has a surrounding wall formed with a threaded hole 502 adjacent to the air outlet end 500 of the tube 50 and a radial hole 511 between the air inlet end 510 of the tube and the first threaded hole 502 of the tube 50. In the present embodiment, the radial hole 511 is a threaded hole.

The flexible bidirectional valve unit 6 is disposed fittingly in the tube 50 and includes a cup-like first check valve member 611 which is located adjacent to the radial hole 511. The first check valve member 611 opens downwardly and has a base end and an opposite flaring end which contacts tightly and normally an inner surface of the surrounding wall of the tube 50 so as to prevent air flow from the inlet end 510 to the outlet end 500 of the tube 50. The valve unit 6 further includes a cup-like second check valve member 610 which opens upwardly and which has a base end connected integrally to the base end of the first check valve member 611 and an opposite flaring end contacting tightly and normally the inner surface of the surrounding wall of the tube 50 so as to prevent air flow from the outlet end 500 to the inlet end 510 of the tube 50. A positioning rod 60 has an upper end connected to the perforated plate 501 and a lower end which extends to the second check valve member 610 and which is connected to the base end of the latter so as to support the valve members 610,611 in the tube 50.

The valve actuator 7 includes an actuating rod 71 and means for mounting slidingly and sealingly the actuating rod 71 to the tube 50. The mounting means includes an externally threaded hollow cylinder 70 which engages threadably the radial hole 511. The cylinder 71 is formed with an inwardly extending flange 75 that defines a through-hole 700 through which the actuating rod 71 extends slidably. The actuating rod 71 has an operating end 711 formed with an enlarged head 74 and an enlarged push end 710 for pushing the flaring end of the first check valve member 611. In the present embodiment, the enlarged head 74 is a nut which is connected to the operating end 711. A coil spring 73 is sleeved on the actuating rod 71 and is located between the flange 75 and the enlarged head 74 so as to displace normally the push end 710 of the actuating rod 71 from the first check valve member 611. Two seal rings 72 are axially aligned with each other and are disposed tightly in the cylinder 70 on one side of the flange 75 opposite to the coil spring 73 for contacting tightly and sealingly the push end 710 of the actuating rod 71 when the push end 710 is displaced from the first check valve member 611.

Referring to FIGS. 1 and 2, the automatic relief valve unit 8 is mounted to the tube 50 between the bidirectional valve unit 6 and the air outlet end 500 of the tube 50. The relief valve unit 8 includes a valve seat 80 mounted to the surrounding wall of the tube 50. The valve seat 80 has a first externally threaded end portion engaged threadably to the threaded hole 502 of the tube 50, a second externally threaded end portion opposite to the first externally threaded end portion, a through-hole 800 communicating with an interior of the tube 50, and a dial 801 with pressure scales provided thereon. A rotatable cap member 81 has a plate end 814 which is formed with an axial hole 811 that is aligned with the through-hole 800 of the valve seat 80 and an annular flange 810 which extends from the plate end 814 and which is connected threadably to the second externally threaded end portion of the seat 80. A pointer 813 extends radially outward from the flange 810 of the cap member 81 and is to be registered selectively with one of the pressure scales by rotating the rotatable cap member 81 relative to the valve seat 80. The flange 810 of the cap member 81 is formed with at least one vent hole 812 adjacent to the plate end 814. In the present invention, the flange 810 is formed with two opposite vent holes 812.

A relief valve piston 82 is received slidably in the rotatable cap member 81 and has a piston shaft 820 extending therefrom. The piston shaft 820 is aligned with the through-hole 800 of the valve seat 80 and extends slidably through the axial hole 811 of the plate end 814 of the cap member 81. A relief valve spring 83 is mounted between the relief valve piston 82 and the plate end 814 of the rotatable cap member 81 so as to normally bias the relief valve piston 82 to block the through-hole 800 of the valve seat 80. It is noted that rotation of the cap member 81 results in the variation of the biasing force of the relief valve spring 83 which acts on the relief valve piston 82 and which is directly proportional to a predetermined value of the desired inflate pressure of the inflatable article. The relief valve piston 82 is moved toward the plate end 814 of the cap member 81 by the air in the tube 50 so as to unblock the through-hole 800 of the valve seat 80 when the pressure in the tube 50 exceeds the predetermined value.

Figure 4:
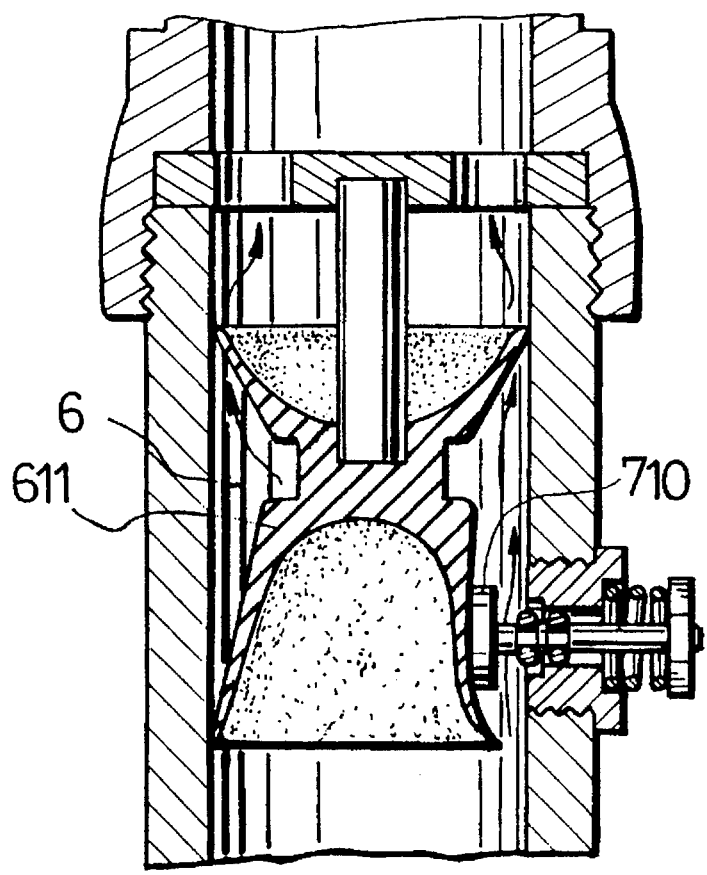
FIG. 4 is a view similar to that of FIG. 3 when the actuating rod of the apparatus is operated.

Referring to the drawings, in use, the air inlet end 510 of the tube 50 is adapted to be connected to a compressor. At this time, air flow from the inlet end 510 to the outlet end 500 of the tube 50 is prohibited since the actuating rod 71 has yet to be operated (see FIG. 3). When an inflatable article is to be inflated, the air outlet end 500 of the tube 50 is adapted to be connected to the inflatable article, and the cap member 81 is rotated to register the pointer 813 with one of the pressure scales on the dial 801 which represents the predetermined value of the desired inflate pressure of the inflatable article. When the operating end 711 of the actuating rod 71 is operated, the push end 710 pushes the flaring end of the first check valve member 611 to disengage the inner surface of the surrounding wall of the tube 50 so as to permit air flow from the inlet end 510 to the outlet end 500 of the tube 50 via the second check valve member 610 (see FIG. 4) since the flaring end of the second check valve member 610 disengages the inner surface of the surrounding wall of the tube 50 due to the air flow through the first check valve member 611, thereby supplying compressed air to the inflatable article.

When the pressure in the tube 50 exceeds the predetermined value, the relief valve piston 82 is moved toward the plate end 814 of the cap member 81 to unblock the through-hole 800 of the valve seat 80 since the pressure in the tube 50 is greater than the biasing force of the relief valve spring 83 acting on the relief valve piston 82, thereby releasing the compressed air in the tube 50 via the vent holes 812. It should be noted that a hissing sound will be generated when the relief valve unit 8 releases the compressed air in the tube 50 such that the operating end 711 of the actuating rod 71 can be released to enable the first check valve member 611 to prevent further air flow from the inlet end 510 to the outlet end 500 of the tube 50.

Accordingly, the apparatus of the present invention has the following advantages:

1. The apparatus of the present invention can release the air in the tube 50 automatically when the pressure therein exceeds a predetermined value.

2. The supply of compressed air through the tube 50 can be stopped immediately by simply releasing the operating end 711 of the actuating rod 70, thereby obviating the need to deactivate the compressor to achieve the same.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. An apparatus for connecting an inflatable article to a compressor so as to supply compressed air to the inflatable article, said apparatus comprising:

an elongated tube having an air inlet end adapted to be connected to the compressor and an air outlet end adapted to be connected to the inflatable article, said tube further having a surrounding wall formed with a radial hole;

a flexible bidirectional valve unit which is disposed fittingly in said tube and which includes a cup-like first check valve member located adjacent to said radial hole, said first check valve member opening downwardly and having a base end and an opposite flaring end which contacts tightly and normally an inner surface of said surrounding wall of said tube so as to prevent air flow from said inlet end to said outlet end of said tube, said valve unit further including a cup-like second check valve member which opens upwardly and which has a base end connected integrally to said base end of said first check valve member and an opposite flaring end contacting tightly and normally said inner surface of said surrounding wall of said tube so as to prevent air flow from said outlet end to said inlet end of said tube;

a valve actuator including an actuating rod which extends into said radial hole of said tube and which is operable so as to push said flaring end of said first check valve member to disengage said inner surface of said surrounding wall of said tube in order to permit air flow from said inlet end to said outlet end of said tube, said valve actuator further including means for mounting slidingly and sealingly said actuating rod to said tube; and an automatic relief valve unit mounted to said tube between said bidirectional valve unit and said air outlet end of said tube, said relief valve unit releasing air in said tube when pressure therein exceeds a predetermined value.

2. An apparatus as claimed in claim 1, wherein said elongated tube includes a first tube part which has a first end serving as said air outlet end and an internally threaded second end, and a second tube part which has an externally threaded first end connected threadably to said internally threaded second end of said first tube part and a second end serving as said air inlet end of said tube.

3. An apparatus as claimed in claim 1, wherein said radial hole of said tube is a threaded hole, said actuating rod having an operating end formed with an enlarged head and an enlarged push end for pushing said flaring end of said first check valve member, said mounting means including an externally threaded hollow cylinder engaging threadably said radial hole, said cylinder being formed with an inwardly extending flange that defines a through-hole through which said actuating rod extends slidably, said mounting means further including a coil spring which is sleeved on said actuating rod and which is located between said flange and said enlarged head so as to displace normally said push end of said actuating rod from said first check valve member.

4. An apparatus as claimed in claim 3, wherein said mounting means further includes a seal ring which is disposed tightly in said cylinder on one side of said flange opposite to said coil spring for contacting tightly and sealingly said push end of said actuating rod when said push end is displaced from said first check valve member.

5. An apparatus as claimed in claim 1, wherein said automatic relief valve includes a valve seat mounted to said surrounding wall of said tube and having a through-hole communicated with an interior of said tube, a rotatable cap member having a plate end and an annular flange which extends from said plate end and which is connected threadably to said valve seat, said cap member being formed with at least one vent hole, a relief valve piston received slidably in said rotatable cap member and aligned with said through-hole of said valve seat, and a relief valve spring mounted between said relief valve piston and said plate end of said rotatable cap member so as to bias normally said relief valve piston to block said through-hole of said valve seat, said relief valve piston being moved toward said plate end of said cap member to unblock said through-hole of said valve seat when the pressure in said tube exceeds the predetermined value.

6. An apparatus as claimed in claim 5, wherein said valve seat has a dial with pressure scales provided thereon, said annular flange of said rotatable cap member having a pointer to be registered selectively with one of said pressure scales by rotating said rotatable cap member relative to said valve seat, rotation of said cap member resulting in variation of biasing force of said relief valve spring acting on said relief valve piston.

* * * * *